United States Patent [19]

Doumani et al.

[11] Patent Number: 4,910,434

[45] Date of Patent: Mar. 20, 1990

[54] MULTIFUNCTIONAL ENCLOSURE FOR WIRING BOARD IN DISPLAY

[75] Inventors: George A. Doumani, No. Andover; Victor M. Samarov, Carlisle, both of Mass.

[73] Assignee: Digital Equipment Corporation, Maynard, Mass.

[21] Appl. No.: 175,773

[22] Filed: Mar. 31, 1988

[51] Int. Cl.$^4$ .................... H01J 23/16; H01J 29/96; H05K 5/04; A47B 5/00

[52] U.S. Cl. .................................... 315/3; 315/32; 315/112; 361/399; 313/11; 312/7.2

[58] Field of Search .............. 361/399; 315/3, 32, 315/112; 313/11; 312/7.2

[56] References Cited

U.S. PATENT DOCUMENTS

| | | | |
|---|---|---|---|
| 3,944,892 | 3/1976 | Johnson et al. | 361/399 |
| 4,400,645 | 8/1983 | Simouits, Jr. et al. | 315/3 |
| 4,677,344 | 6/1987 | Toshiyasu et al. | 361/399 |
| 4,716,493 | 12/1987 | Zelkowitz | 361/399 |

Primary Examiner—Eugene R. LaRoche
Assistant Examiner—Michael B. Shingleton
Attorney, Agent, or Firm—Hayes, Soloway, Hennessey & Hage

[57] ABSTRACT

An enclosure for a video-amplifier printed wiring board (PWB) located in close proximity to, and substantially structurally separated from the cathode ray tube (CRT) connector base in a video display terminal (VDT). The enclosure combines the functions of a structural support for the board on the VDT chassis, of an EMI/RFI shield for the board, and of an expanded heat transfer-surface heatsink. The enclosure comprises a one-piece casting with a cavity formed by a bottom wall, side walls adjacent to the bottom wall, and an open side opposite to the bottom wall. It further has integral mounting features to locate and structurally support the board in the cavity with the high heat-dissipation components facing the inner surface of the cavity's bottom wall. The outer surface of the bottom wall is provided with integral, heat-dissipating fins to form an expanded heat-transfer surface heatsink. The bottom wall has a substantially circular opening through which the CRT connector base protrudes into close proximity with the video board, being connected thereto by flexible electrical wires transmitting substantially no mechanical load to the CRT base. The cavity is covered at the open side with an electrically conductive cover to complete the EMI/RFI shield around the video board, the cover preferably being part of the VDT chassis, thus also providing structural support to the enclosure.

12 Claims, 4 Drawing Sheets

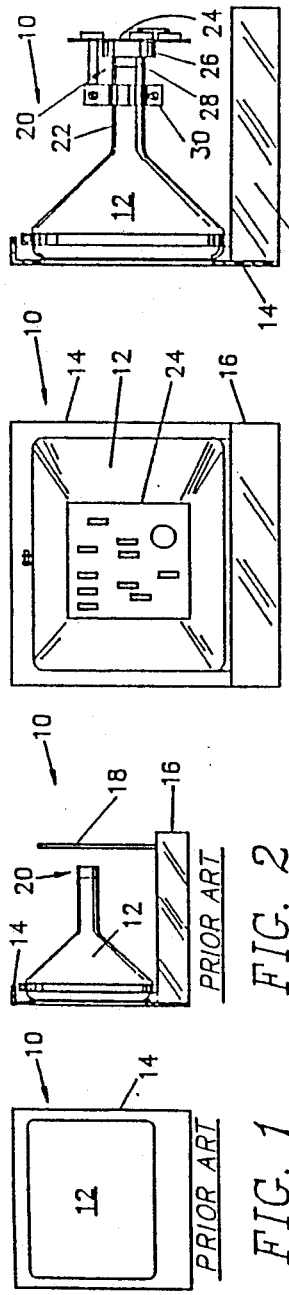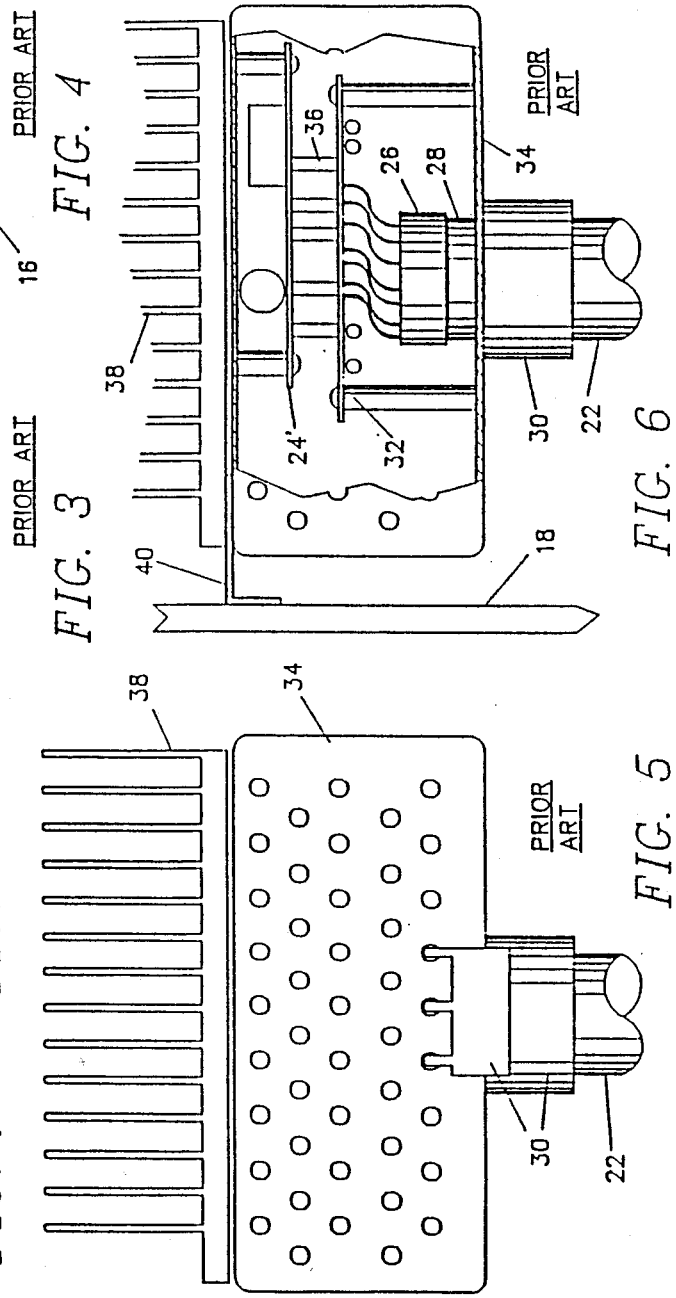

MULTIFUNCTIONAL ENCLOSURE FOR WIRING BOARD IN DISPLAY

BACKGROUND OF THE INVENTION

The present invention relates to enclosures for electronic components, and more particularly to enclosures for cathode ray tube assemblies including a video-amplifier printed wiring board located in close proximity to, and structurally separated from the cathode ray tube connector base.

A typical video display monitor or terminal (VDT) 10 as employed with computers, and the like, is shown in simplified form in FIG. 1. The VDT 10 includes a cathode ray tube (CRT) 12 mounted behind a bezel 14 on a horizontal chassis base 16. As necessary and convenient, the chassis base 16 may carry one or more vertical chassis members 18. Typically, a decorative and protective cover is placed around the above-described components.

Connected to the CRT 12 at its electrical connecting point 20 is a video amplifier printed wiring board (PWB). The video amplifier PWB imposes certain requirements relative to its design and positioning. For one, it should be as close as possible to the CRT connecting point 20; that is, the wires between the PWB and the CRT should be as short as possible. For another, provision may have to be made for heat sinking certain high heat-dissipation components on the PWB. For yet another, components emitting radio frequency interference (RFI) and/or electromagnetic interference (EMI) may have to be shielded. In doing all this, the video amplifier PWB and its associated apparatus must not impose possibly damaging forces on the neck 22 of the CRT 12.

One prior art broadly utilized arrangement of locating the video amplifier PWB 24 with respect to the CRT 12 in VDT's such as 10, especially those relatively simple monochrome products with fewer, relatively low heat-dissipation components on the PWB 24, is shown in FIGS. 3 and 4. PWB 24, as an assembly is mounted, via socket 26, directly on the CRT's connector base 28, sometimes with the addition of a mechanical clamp and support 30, acting on the rear of the CRT neck 22. Such a simplified solution involves the transmission of all static and dynamic loads from the PWB 24 directly to the CRT 12, thus making it vulnerable to mechanical damage.

The weight and size of the PWB assembly increases considerably for color VDT's, and further where high heat-dissipation components on board require, for example, finned metal heatsinks for thermal management, and still further where a complete box-like EMI/RFI shield is required around the PWB. The respective weight and size increase makes the arrangement of FIGS. 3 and 4 impractical for CRT mechanical integrity reasons.

To overcome some of those above difficulties, another prior art arrangement, as shown in FIGS. 5 and 6, splits the circuitry, components, and hence the weight, between a chassis-mounted video amplifier PWB 24' proper and an auxiliary CRT board 32 mounted on the connector base 28 of CRT 12 similarly to the arrangement of FIGS. 3 and 4. High heat-dissipation components, requiring a heatsink 38 for thermal management, must be placed on the chassis-mounted PWB 24' to relieve the CRT 12 from mechanical loads. A vented EMI/RFI shield box 34 is also mounted to one of the VDT's chassis members 18 and spaced from the CRT 12 in order to allow for the assembly inaccuracies, dynamic excursions, etc., of the CRT 12 without its coming into mechanical contact with chassis-mounted parts. Special spring-loaded, floating, frictional contacts 36 are used in this arrangement to interconnect the two boards 24', 32, respectively, while limiting mechanical loads transmitted by such interconnect from parts, relatively rigidly mounted to the VDT chassis, to the CRT neck 22. The disadvantages of such an arrangement are its complexity and costliness, the presence of still considerable weight on the CRT base, and multiple thermal interfaces making the thermal path between components requiring heat sinking and the chassis-supported heatsink 38 (via bracket 40) relatively high-resistance.

SUMMARY OF THE INVENTION

The present invention provides an enclosure for a video-amplifier printed wiring board to be located in close proximity to, and substantially structurally separated from a cathode ray tube connector base in a video display terminal wherein the enclosure combines the functions of a structural support for the board on the display's chassis, of an EMI/RFI shield for the board, and of an expanded heat transfer-surface heatsink serving high heat-dissipation components on the board, comprising, a unitary body member of a thermally and electrically conductive material having a bottom wall, a plurality of side walls adjacent and substantially perpendicular to the bottom wall, and an open side opposite to the bottom wall defining a cavity surrounded by the walls, the body member including integral mounting means for locating and structurally supporting the video-amplifier printed wiring board in the cavity with the high heat-dissipation components thereof facing, in close proximity, the inner surface of the bottom wall, the outer surface of the bottom wall having integral, heat-dissipating fins forming an expanded heat-transfer surface heatsink, the bottom wall having an opening through which the cathode ray tube's connector base protrudes into close proximity with the video-amplifier printed wiring board, the cathode ray tube being connected to the video-amplifier printed wiring board by flexible electrical wires transmitting substantially no mechanical load to the cathode ray tube's base, the cathode ray tube being spaced from the edges of the opening a distance sufficient to prevent substantially all mechanical loads from the enclosure from being transmitted to the cathode ray tube; means for closing the open side of the body member to form an EMI/RFI-tight enclosure about the cavity; and, means for supporting the body member on the chassis of the video display terminal.

In the preferred embodiment or the invention, at least one of the walls forming the cavity have ventilation openings therethrough. Additionally in the preferred embodiment, the means for closing the open side of the body member to form an EMI/RFI-tight enclosure about the cavity and the means for supporting the body member on the video display terminal in combination comprise, part of the chassis of the video display terminal to which the body member is attached disposed with the part over the open side; and, means for attaching the part over the open side.

DESCRIPTION OF THE DRAWINGS

FIG. 1 is a simplified front view of a video display terminal as wherein the present invention can be used.

FIG. 2 is a side view of the video display terminal of FIG. 1 with the cover removed.

FIG. 3 is a rear view of the video display terminal such as that of FIGS. 1 and 2 showing a prior art approach of mounting a video-amplifier printed wiring board on the CRT neck end.

FIG. 4 is a side view of the prior art mounting approach for a video-amplifier printed wiring board of FIG. 3.

FIG. 5 is a top view of another prior art approach to the mounting of a video-amplifier printed wiring board in conjunction with a video display terminal with the addition of RFI/EMI shielding and heat sinking.

FIG. 6 is a partially cutaway view of FIG. 5 showing the internal components and their manner of mounting and support.

DESCRIPTION OF THE PREFERRED EMBODIMENT

Briefly, this invention overcomes the above-described disadvantages of the prior art by providing an enclosure for a video-amplifier printed wiring board (PWB) located in close proximity to, and structurally separated from, the cathode-ray-tube connector base in a video display terminal (VDT). The enclosure combines the functions of a structural support for the PWB on the VDT chassis, of an EMI/RFI shield for the board, and of an expanded heat-transfer surface heatsink for pre-specified, high heat-dissipation components on the board in a unique combination heretofore unknown in the art.

Figure 7:
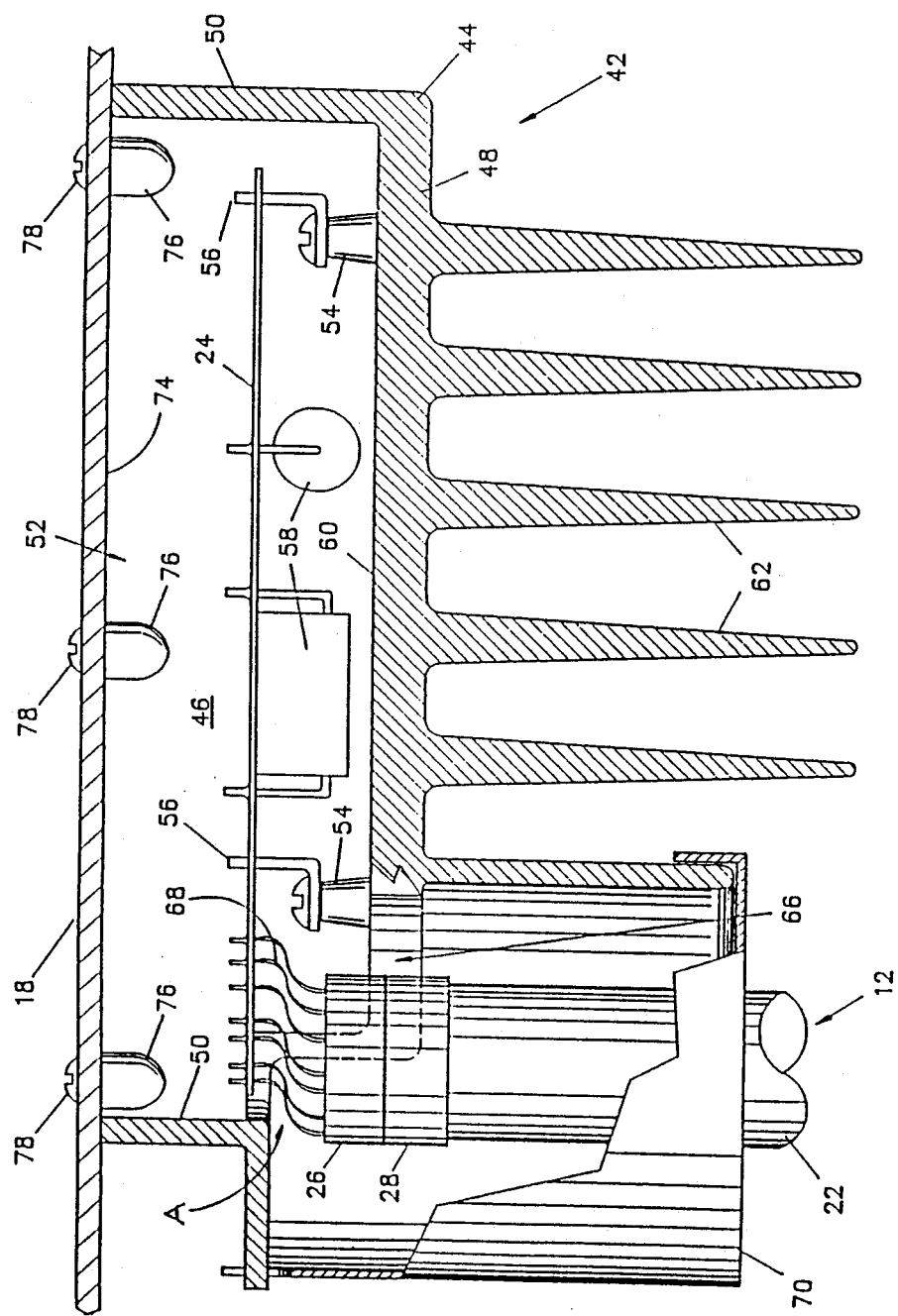
FIG. 7 is a partially cutaway top view of the apparatus of the present invention.
Figure 8:
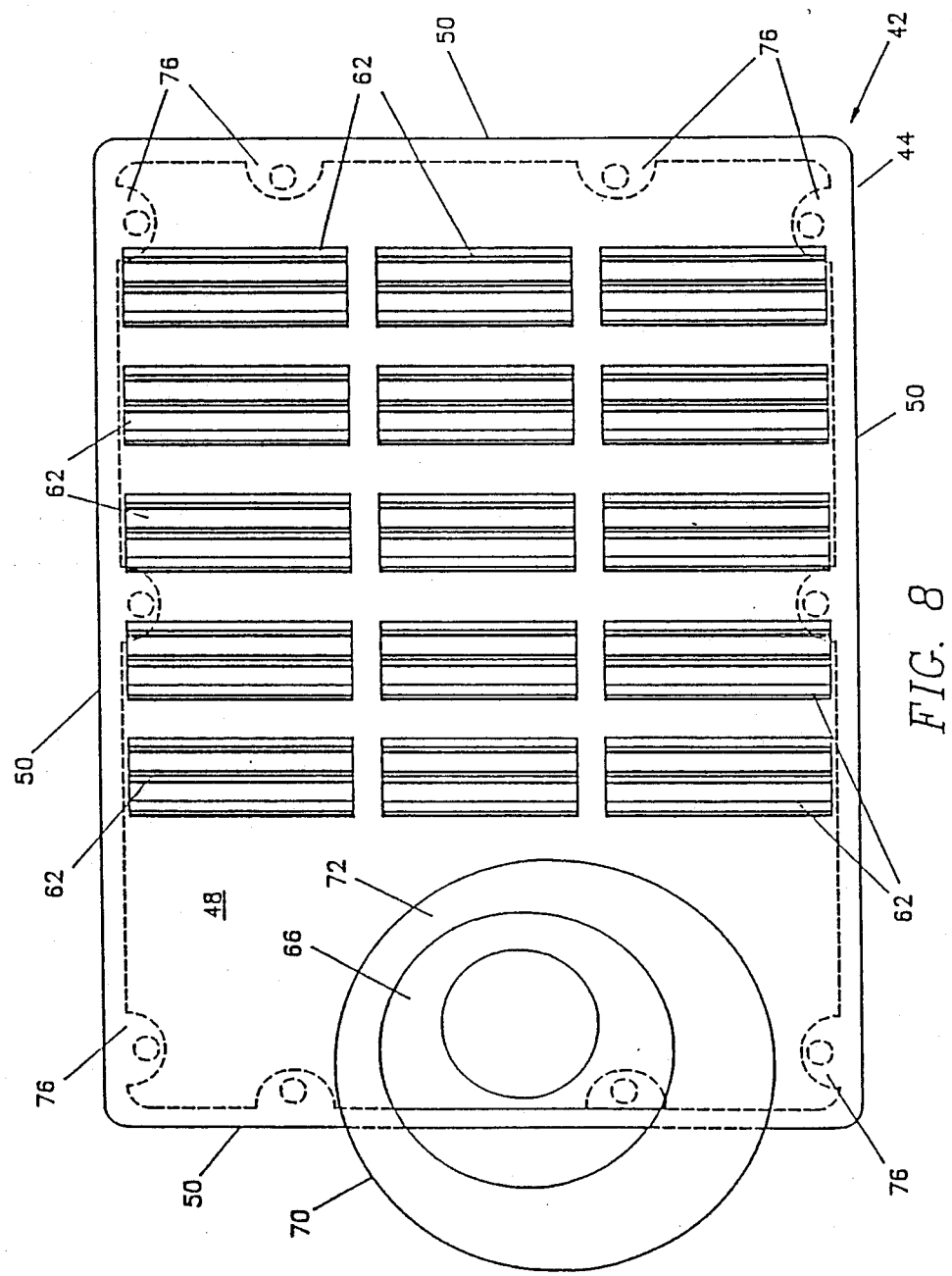
FIG. 8 is a front view of the apparatus of the present invention from the CRT side thereof.
Figure 9:
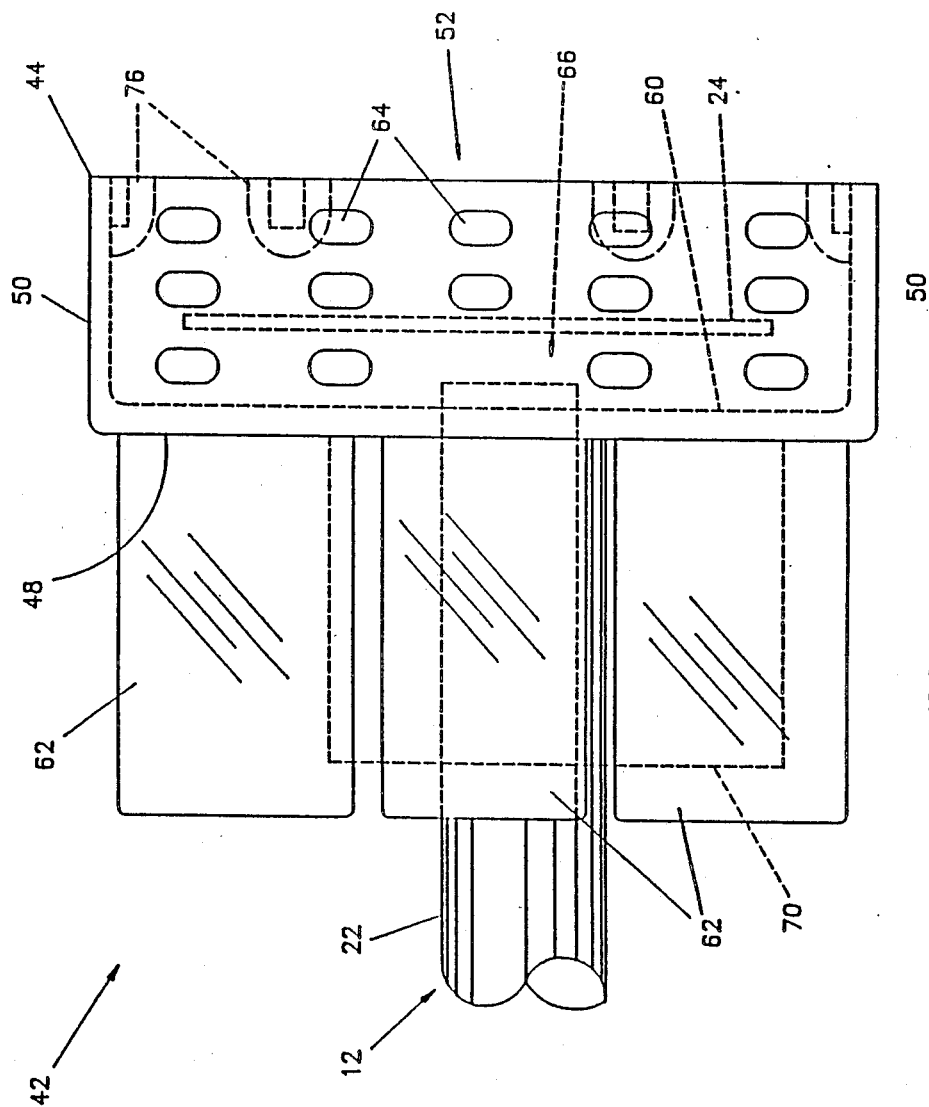
FIG. 9 is a side view of the apparatus of the present invention.

The multi-function enclosure of the present invention in its preferred embodiment is shown in FIGS. 7–9 wherein it is generally indicated as 42. Enclosure 42 according to this invention is characterized in that, in order to efficiently and cost-effectively perform the above combined functions, in a manner that allows a minimal distance A to be maintained between the video amplifier PWB 24 and the connector base 28 of the CRT 12 (as desirable for high-speed circuit operation—see FIG. 7) while transmitting substantially no mechanical load to the connector base 28 and CRT neck 22, the enclosure 42 preferably comprises a one-piece casting 44 formed of an electrically and thermally conductive metal, e.g. aluminum with a cavity 46 formed by a substantially vertical bottom wall 48, side walls 50 adjacent to the bottom wall 48, and having an open side 52 opposite to the bottom wall 48. The enclosure 42 further includes integral mounting bosses 54 carrying mounting clips 56 to locate and structurally support the PWB 24 in the cavity 46, preferably parallel to, and with high dissipation components 58 facing, in close proximity, the inner surface 60 of the bottom wall 48 and connected thereto in a thermally conductive manner, e.g. via the integral bosses 54 and metal mounting clips 56.

The outer surface of the bottom wall 48 is provided with integral, substantially vertical, heat-dissipating fins 62 to form an expanded heat-transfer surface heatsink. Some or all of the casting's walls 48, 50 forming the cavity 46 are preferably provided with louvers 64 for ventilation as best seen in FIG. 9.

The bottom wall 48 has a substantially circular opening 66 through which the base 28 and neck 22 of CRT 12 protrude into close-proximity with the video amplifier PWB 24 and the base 28 is connected thereto by socket 26 and flexible electrical wires 68, thereby transmitting virtually no mechanical load to the CRT base 28 and neck 22. A removable metal enclosure 70 of semi-cylindrical shape is carried by the casting 44 to complete the protection of the neck 22 and base 28. Formed between the CRT's neck 22 and the edges of the opening 66 as defined by the casting 44 and enclosure 70 in combination is a substantially uniform annular clearance area 72 of a magnitude which prevents substantially all mechanical loads from the enclosure 42 and/or the VDT chassis 18 from being transmitted to the CRT base 24. The cavity 46 is covered at the open side 52 with an electrically conductive cover to complete the EMI/RII shield around the video PWB 24. In the preferred embodiment as shown, the cover is formed by a part 74 of a VDT vertical chassis member 18, thus providing structural support to the enclosure 42. The enclosure 42 can be conveniently and easily mounted to the vertical chassis member 18 as shown in FIG. 7 by providing threaded bosses 76 in the sidewalls 50 of the casting 44 around the open side 52 and threading screws 78 through the chassis member 18 and into the bosses 76. A separate cover and supporting brackets mounted to the chassis members 16, 18 could, of course, be employed if desired, but are not preferred in the interest of simplicity of construction and minimization of parts.

Thus, it can be seen that the multi-function enclosure 42 of the present invention has met all its objectives as can be appreciated from the description thereof and the drawing figures which accompany it. The metal casting comprising the RFI/EMI enclosures finned heatsink is supported by the chassis of the VDT. The video amplifier PWB, in turn, is supported by the casting and, therefore, can be as heavy as necessary without the possibility of imparting damaging forces to the CRT. High heat-dissipation components on the PWB are mounted in close proximity to the heatsink with a direct heat path to the heat-dissipating fins. The connector base of the CRT is mounted in close proximity to the PWB, as desired, with virtually no loading forces transferred to the CRT.

While the invention has been described with reference to specific embodiments, the description is illustrative of the invention add is not to be construed as limiting the invention. Various modifications and applications may occur to those skilled in the art without departing from the true spirit and scope of the invention as defined by the appealed claims.

Wherefore, having thus described the present invention, what is claimed is:

1. An enclosure for a video-amplifier printed wiring board to be located in close proximity to, and structurally separated from a cathode ray tube connector base in a video display terminal wherein the enclosure combines the functions of a structural support for the board on the display's chassis, of an EMI/RFI shield for the board, and of an expanded heat transfer-surface heatsink serving high heat-dissipation components on the board, said enclosure comprising:

(a) a one-piece body member of a thermally and electrically conductive material defining a cavity surrounded by a bottom wall, side walls adjacent to said bottom wall, and an open side opposite to said bottom wall, said body member including integral mounting means for coating and structurally supporting the video-amplifier printed wiring board in said cavity with the high heat-dissipation components thereof facing, in close proximity, the inner surface of said bottom wall and connected thereto in a thermally conductive manner, the outer surface of sad bottom wall having integral, heat-dissipated fins forming an expanded heat-transfer surface heatsink, said bottom wall having an opening through which the cathode ray tube's connector base protrudes into close proximity with the video-amplifier printed wiring board, the cathode ray tube being connected to the video-amplifier printed wiring board by flexible electrical wires transmitting substantially no mechanical load to the cathode ray tube's base, the cathode ray tube forming with respect to the edges of said opening a clearance of a magnitude which prevents substantially all mechanical loads from the enclosure from being transmitted to the cathode ray tube;.

(b) means for closing said open side of said body member to form an EMI/RFI-tight enclosure about said cavity; and, (c) means for supporting said body member on the chassis of the video display terminal.

2. The enclosure of claim 1, wherein:
at least one of said walls forming said cavity has louver openings therethrough for ventilation.

3. The enclosure of claim 1, wherein said means for closing said open side of said body member to form an EMI/RFI-tight enclosure about said cavity and said means for supporting said body member on the video display terminal in combination comprise:

(a) part of the chassis of the video display terminal to which the body member is attached disposed with said part over said open side; and, (b) means for attaching said part over said open side.

4. The enclosure of claim 3, wherein said attaching means comprises:

(a) a plurality of integral threaded bosses disposed in said body member about the edge of said open side; and (b) a plurality of screws passing through said part into threaded engagement with said threaded bosses.

5. The enclosure of claim 1, wherein said integral mounting means comprises:

(a) a plurality of raised bosses integral with said inner surface of said bottom wall; and, (b) a plurality of thermally conducting mounting clip means carried by respective ones of said raised bosses for mounting the video-amplifier printed wiring board in a thermally conducting relationship with said raised bosses.

6. The enclosure of claim 1, wherein said body member comprises a one-piece metal casting.

7. An enclosure for a video-amplifier printed wiring board to be located in close proximity to, and structurally separated from a cathode ray tube connector base in a video display terminal wherein the enclosure combines the functions of a structural support for the board on the display's chassis, of an EMI/RFI shield for the board, and of an expanded heat transfer-surface heatsink serving high heat-dissipation components on the board, said enclosure comprising:

(a) a unitary body member of a thermally and electrically conductive material having a bottom wall, a plurality of side walls adjacent and substantially perpendicular to said bottom wall, and an open side opposite to said bottom wall defining a cavity surrounded by said walls, said body member including integral mounting means for locating and structurally supporting the video-amplifier printed wiring board in said cavity with the high heat-dissipation components thereof facing, in close proximity, the inner surface of said bottom wall, the outer surface of said bottom wall having integral heat-dissipating fins forming an expanded heat-transfer surface heatsink, said bottom wall having an opening through which the cathode ray tube's connector base protrudes into close proximity with the video-amplifier printed wiring board, the cathode ray tube being connected to the video-amplifier printed wiring board by flexible electrical wires transmitting substantially no mechanical load to the cathode ray tube's base, the cathode ray tube being spaced from the edges of said opening a distance sufficient to prevent substantially all mechanical loads from the enclosure from being transmitted to the cathode ray tube;

(b) means for closing said open side of said body member to form an EMI/RFI-tight enclosure about said cavity; and, (c) means for supporting said body member on the chassis of the video display terminal.

8. The enclosure of claim 7, wherein:
at least one of said walls forming said cavity has ventilation openings therethrough.

9. The enclosure of claim 7, wherein said means for closing said open side of said body member to form an EMI/RFI-tight enclosure about said cavity and said means for supporting said body member on the video display terminal in combination comprise:

(a) part of the chassis of the video display terminal to which the body member is attached disposed with said part over said open side; and, (b) means for attaching said part over said open side.

10. The enclosure of claim 9, wherein said attaching means comprises:

(a) a plurality of integral threaded bosses disposed in said body member about the edge of said open side; and, (b) a plurality of screws passing through said part into threaded engagement with said threaded bosses.

11. The enclosure of claim 7, wherein said integral mounting means comprises:

(a) a plurality of raised bosses integral with said inner surface of said bottom wall; and, (b) a plurality of thermally conducting mounting clip means carried by respective ones of said raised bosses for mounting the video-amplifier printed wiring board in a thermally conducting relationship with said raised bosses.

12. The enclosure of claim 7, wherein said body member comprises a one-piece metal casting.

* * * * *

UNITED STATES PATENT AND TRADEMARK OFFICE
CERTIFICATE OF CORRECTION

PATENT NO. : 4,910,434

DATED : March 20, 1990

INVENTOR(S) : George A. DOUMANI & Victor M. SAMAROV

It is certified that error appears in the above-identified patent and that said Letters Patent is hereby corrected as shown below:

Column 5, line 6, claim 1, section (a), change "coating" to --locating--.

Signed and Sealed this

Twenty-third Day of July, 1991

*Attest:*

HARRY F. MANBECK, JR.

*Attesting Officer*      *Commissioner of Patents and Trademarks*